April 24, 1951  J. D. BOLONGARO  2,550,522
RECIPROCATORY HOE
Filed Jan. 9, 1947
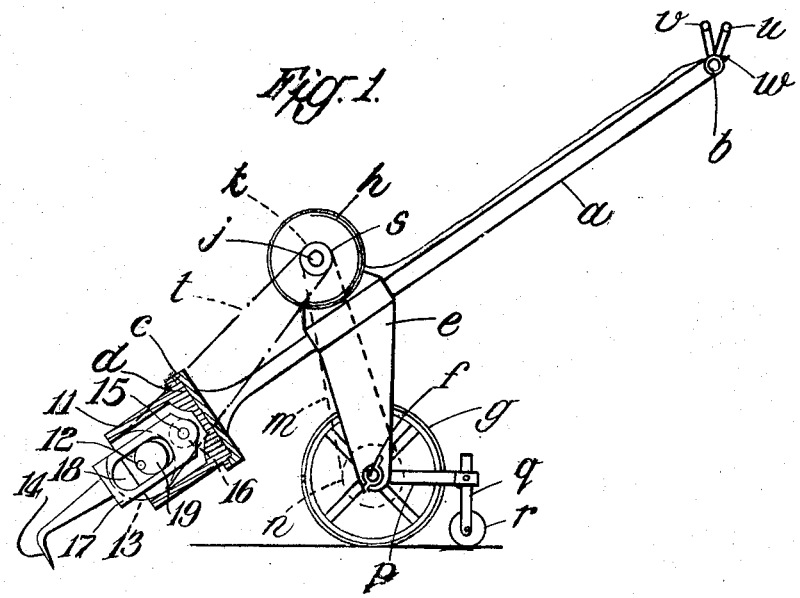
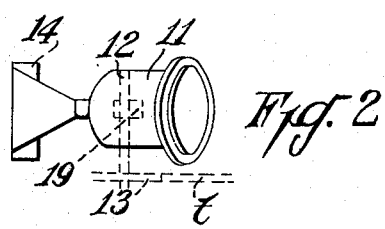
INVENTOR
JAMES DOMINIC BOLONGARO
Hammond & Littell
ATTORNEYS Patented Apr. 24, 1951

2,550,522

UNITED STATES PATENT OFFICE 2,550,522

RECIPROCATORY HOE

James Dominic Bolongaro, Charlbury, England

Application January 9, 1947, Serial No. 720,982
In Great Britain January 24, 1946

1 Claim. (Cl. 97—44)

This invention relates to a hoeing apparatus.

It has for its object the facilitation of the operation of hoeing and comprises a hoe blade mounted for reciprocation or oscillation on a carriage by which it may be moved over the ground to be hoed.

The reciprocation or oscillation of the hoe blade may be effected by gearing from a running wheel of the carriage but preferably is effected by a prime mover, such as an electric motor or a petrol engine, which is mounted on the carriage and arranged to drive an eccentric, a crank shaft or other mechanism with which the hoe blade is connected.

According to the present invention, the blade of such a hoe is arranged to be oscillated at a large angle, e. g. 80°, to the horizontal and constitutes one limb of an L-shaped member, the other limb of which is pivotally mounted in a socket on the carriage and is slotted to accommodate an eccentric by which it may be oscillated.

The carriage may be provided with means whereby the inclination of the blade to the horizontal may be varied and the depth to which the blade penetrates the ground may be adjusted according to requirements by suitable tilting of the carriage.

Preferably the hoe blade, together with its eccentric, is carried by a sleeve arranged to be secured to a face plate, socket plate, or seat on the carriage so that it may be replaced by another implement.

In the accompanying drawing, the invention is illustrated as an attachment to a carriage arranged to be driven by a prime mover and to which other implements for horticultural purposes may be secured detachably in substitution for the hoe-carrying socket assembly here shown.

In the drawing:

Figure 1 is a side elevation partially in section.

Figure 2 is a fragmentary plan view of the illustrative embodiment.

As shown especially in Figure 1, the carriage comprises a shank $a$ with a cross handle $b$ at its upper end and a disc-like seat or socket plate $c$ at its lower end, the seat $c$ being recessed as at $d$. Between the cross handle $b$ and the seat $c$ there is secured to the shank $a$ and dependent therefrom, a bifurcated frame $e$. On a spindle $f$ extending between the bifurcated arms of the frame $e$ is mounted a spiked, ribbed or the like, roller $g$, while carried at the upper side of the bifurcated frame $e$ is an electric motor $h$. At one side of the motor $h$, motor spindle $j$ carries a sprocket wheel $k$ and a chain $m$ is provided to drive a sprocket wheel $n$ on the spindle $f$ of the roller $g$ so that the carriage may be propelled. Extending rearwardly from the backs of the arms of the frame $e$ are arms such as $p$ on each of which is adjustably mounted a rod $q$. The two rods carry a spindle for a roller $r$ so that the inclination of the shank $a$ to the ground may be varied. At the side of the carriage remote from the sprocket wheel $n$, a second sprocket wheel $s$ and chain $t$ are provided, and clutches (not shown), operable by levers $u$, $v$ on the handle $b$, are arranged between the motor spindle $j$ and the sprocket wheels $k$ and $s$. When the prime mover is an electric motor, as shown at $h$, a controlling switch $w$ is provided on the handle $b$.

To the recessed seat $c$ is secured the butt end of a tubular or tool socket 11 in the wall of which is mounted a spindle 12 which passes transversely through the socket 11 and carries at one side a sprocket wheel 13 driven by the chain $t$ from the sprocket wheel $s$.

The hoe blade 14 constitutes one arm of an L-shaped member, the other arm of which is pivoted at 15 in lugs, such as 16, in the socket 11 and has an enlargement 17 in which is formed a slot 18 for the eccentric 19 on the spindle 12, the rotation of which moves the blade 14 up and down about the pivot 15.

It will be understood that, in use, the hoe blade 14 is reciprocated or oscillated as the carriage is moved and, in the case of a hoe having a prime mover, very little exertion by the user is required.

I claim:

In a hoe, the combination including a carriage adapted to be moved over the ground to be hoed and wherein the hoe blade is arranged to be oscillated at a large angle to the horizontal, a socket plate fastened at the base of said carriage, a downwardly opening tool socket member detachably mounted on said socket plate, an L-shaped blade member having two arms, one of which is pivotally mounted in said socket member and having a slot therein, the other arm constituting the hoe blade, and an eccentric rotatably mounted in said socket and engaging said slot so as to oscillate said L-shaped blade member when the eccentric is rotated.

JAMES DOMINIC BOLONGARO.

REFERENCES CITED

The following references are of record in the file of this patent:

UNITED STATES PATENTS

| Number | Name | Date |
|---|---|---|
| 662,015 | Noyes | Nov. 20, 1900 |
| 1,743,195 | Ditlevsen | Jan. 14, 1930 |
| 1,827,074 | Ditlevsen | Oct. 13, 1931 |
| 2,206,264 | Rose | July 2, 1940 |